US011921612B2

(12) United States Patent
Morariu et al.

(10) Patent No.: US 11,921,612 B2
(45) Date of Patent: Mar. 5, 2024

(54) IDENTIFICATION OF COMPUTER PERFORMANCE ANOMALIES BASED ON COMPUTER KEY PERFORMANCE INDICATORS

(71) Applicant: Oracle International Corporation, Redwood City, CA (US)

(72) Inventors: Octavian Gheorghe Morariu, Cluj Napoca (RO); Fa Wang, Palo Alto, CA (US); Raymond Michael Ofiaza Ordona, Hayward, CA (US); Xintao He, Beijing (CN); Mei Yuan, Foster City, CA (US); Victor Campbell Webb, Wellesley, MA (US)

(73) Assignee: Oracle International Corporation, Redwood City, CA (US)

( * ) Notice: Subject to any disclaimer, the term of this patent is extended or adjusted under 35 U.S.C. 154(b) by 1165 days.

(21) Appl. No.: 16/116,274

(22) Filed: Aug. 29, 2018

(65) Prior Publication Data

US 2020/0073780 A1     Mar. 5, 2020

(51) Int. Cl.
*G06F 11/34*     (2006.01)
*G06F 11/30*     (2006.01)

(52) U.S. Cl.
CPC ...... *G06F 11/3495* (2013.01); *G06F 11/3006* (2013.01); *G06F 11/301* (2013.01)

(58) Field of Classification Search
CPC . G06F 11/3495; G06F 11/3006; G06F 11/301
See application file for complete search history.

(56) References Cited

U.S. PATENT DOCUMENTS

| 8,812,586 B1* | 8/2014 | Kulkarni | H04L 43/08 |
| | | | 709/203 |
| 2004/0039968 A1* | 2/2004 | Hatonen | G06N 3/08 |
| | | | 714/39 |

(Continued)

OTHER PUBLICATIONS

Dapeng Liu, Opprentice: Towards Practical and Automatic Anomaly Detection Through Machine Learning. In Proceedings of the 2015 Internet Measurement Conference (IMC '15). Association for Computing Machinery, New York, NY, USA, 211-224. https://doi.org/10.1145/2815675.2815679 (Year: 2015).*

(Continued)

*Primary Examiner* — Michael J Dalbo (57) ABSTRACT

In exemplary embodiments, a computer system detects performance anomalies for user computer services. Physical databases convert physical database KPIs into logical database KPI vectors for individual user services and individual time intervals. Physical application servers convert physical application server KPIs into logical application server KPI vectors for the individual user services and time intervals. Physical web servers convert physical web server KPIs into logical web server KPI vectors for the individual user services and time intervals. A KPI server combines the logical database KPI vectors, the logical application server KPI vectors, and the logical web server KPI vectors for individual time intervals into user service KPI vectors for the individual user services during the time intervals. The KPI server detects outlier user service KPI vectors as compared to normal user service KPI vectors and indicates corresponding computer performance anomalies for the user services.

20 Claims, 7 Drawing Sheets

(56) References Cited

U.S. PATENT DOCUMENTS

| | | | | |
|---|---|---|---|---|
| 2015/0046757 A1* | 2/2015 | Brew | .................. | G06F 11/3409 |
| | | | | 714/47.3 |
| 2017/0019315 A1* | 1/2017 | Tapia | .................. | H04L 41/0631 |
| 2019/0173765 A1* | 6/2019 | Bertran | ............... | H04L 41/5025 |
| 2019/0230011 A1* | 7/2019 | Gandham | ............. | H04L 41/145 |
| 2019/0364088 A1* | 11/2019 | Fu | ........................... | H04L 43/08 |

OTHER PUBLICATIONS

Fontugne, Romain, Johan Mazel, and Kensuke Fukuda, "Hashdoop: A MapReduce framework for network anomaly detection," Conference Paper in Proceedings—IEEE INFOCOM, Apr. 2014, 7 pages.

Repp, Nicolas, et al. "A Cross-Layer Approach to Performance Monitoring of Web Services," Emerging web services technology. Birkhäuser Basel, 2007. 11 pages.

Apache Kafka Documentation, downloaded from https://kafka.apache.org/documentation/ on Sep. 13, 2018, 193 pages.

Overview—Spark 2.3.1 Documentation, downloaded from https://spark.apache.org/docs/latest/ on Sep. 13, 2018, 3 pages.

* cited by examiner

IDENTIFICATION OF COMPUTER PERFORMANCE ANOMALIES BASED ON COMPUTER KEY PERFORMANCE INDICATORS

TECHNICAL BACKGROUND

A large cloud computing network features numerous data centers around the globe that each have multiple servers or computers. These data centers host web sites, sales applications, media content, financial databases, customer records, and the like. The data centers serve users such as hospitals, schools, media networks, government agencies, and web businesses. The management of such large and complex cloud computing networks is a significant challenge. Within a physical data center, there are multiple services, such as logical databases and logical servers, that share the physical data center hardware. The logical databases and logical servers are software applications that are stored and executed within the physical data center hardware. In large cloud networks, there may be millions of these logical databases and servers (or more) to manage across thousands of computers (or more).

Computer analysts often study computer performance computer Key Performance Indicators (KPIs) to manage cloud computing networks. The computers that comprise the cloud generate computer KPIs as a part of their normal operation. The computer KPIs are human-readable statements that indicate the current status of their circuitry, operating systems, databases, and applications. Typical computer KPIs may comprise "CPU X24 USAGE=84%" or "MEMORY A4 LATENCY=0.04 ms." In large cloud computing networks, the numerous computers produce a massive amount of KPIs every second.

Data network operators use computer KPIs to service their users. For example, a computer technician may receive an alarm that a large web retailer is experiencing excessive web server latency. The computer technician may study the relevant computer KPIs for the data centers that serve the web retailer to solve the web latency problem. The computer technician may have to manually identify the data center KPIs that are relevant to the logical servers and databases of the web retailer. The computer technician may then establish an automated computer response to the specific computer KPIs pertinent to these logical components. This manual approach to processing computer KPIs for logical components is not scalable for large cloud networks.

Since computer technicians cannot manually handle the massive amount of computer KPIs, automated computer tools have been developed to process the KPIs. These KPI analytic tools do not efficiently and effectively process KPIs from various physical systems to detect computer performance anomalies for individual users. Current KPI analytic tools are not optimized to process the massive quantity of computer KPIs from the perspective of the logical user services. Thus, current KPI analytic tools are not configured to efficiently detect and mitigate complex computer performance anomalies in real time for individual cloud computing users.

TECHNICAL OVERVIEW

In exemplary embodiments, a computer system detects performance anomalies for user computer services. Physical databases convert physical database KPIs into logical database KPI vectors for individual user services and individual time intervals. Physical application servers convert physical application server KPIs into logical application server KPI vectors for the individual user services and time intervals. Physical web servers convert physical web server KPIs into logical web server KPI vectors for the individual user services and time intervals. A KPI server combines the logical database KPI vectors, the logical application server KPI vectors, and the logical web server KPI vectors for individual time intervals into user service KPI vectors for the individual user services during the time intervals. The KPI server detects outlier user service KPI vectors as compared to normal user service KPI vectors and indicates corresponding computer performance anomalies for the user services.

DETAILED DESCRIPTION

Figure 1:
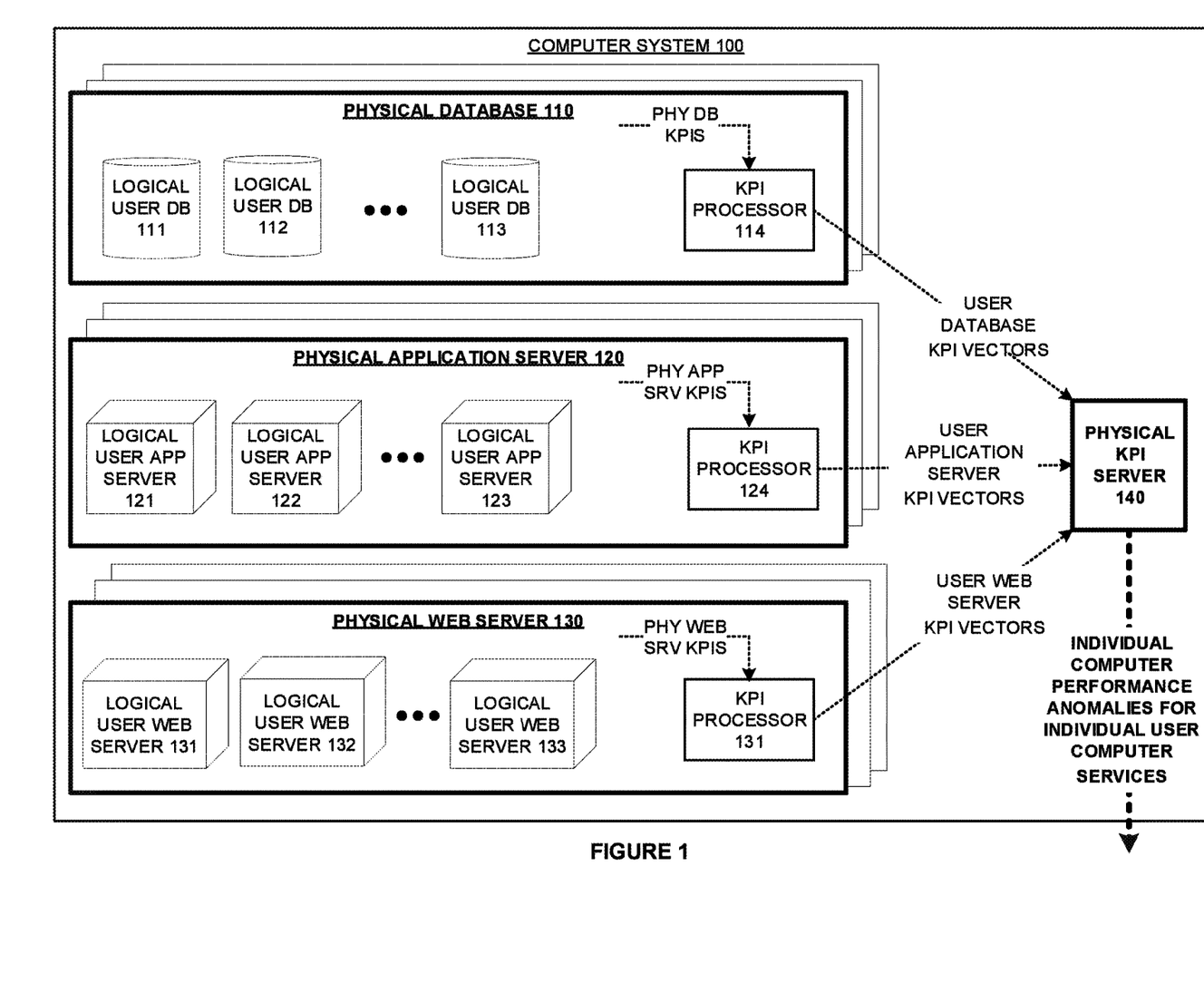
FIG. 1 illustrates a computer system to identify computer performance anomalies based on Key Performance Indicators (KPIs) in an exemplary embodiment although the computer system may vary in other embodiments.

FIG. 1 illustrates computer system 100 to identify computer performance anomalies based on computer Key Performance Indicators (KPIs) in an exemplary embodiment although computer system 100 may vary in other embodiments. KPIs comprise text statements that indicate computer system status. Exemplary KPIs include: microprocessor usage, memory usage, transceiver data rate, application status, session status, power status, environmental conditions, and the like. Computer performance anomalies comprise unhealthy computer conditions. Exemplary computer performance anomalies include web site latency, hanging user applications, logical memory overflow, or some other computer problem.

In this exemplary embodiment, computer system 100 comprises physical database 110, physical application server 120, physical web server 130, physical KPI server 140. In other embodiments, computer system 100 may comprise other types of servers, databases, or computers that process KPIs as described for computer system 100.

Physical database 110 hosts logical user databases 111-112 and KPI processor 114. Physical application server 120 hosts logical user application servers 121-123 and KPI processor 124. Physical web server 130 hosts logical user web servers 131-133 and KPI processor 134. Note that the number of databases and servers that are shown on FIG. 1 has been restricted for clarity. In a large global deployment, there would be a massive number of physical databases and servers to support a huge number of users. Numerous logical databases and logical servers are often required for most users. Advantageously, computer system 100 is linearly scalable by distributing the processing, aggregation of KPIs and outliner detection to parallel execution sub-systems, making it adequate for deployment in large and complex computer networks that support huge user populations.

Physical database 110 comprises computer equipment like Random Access Memory (RAM), flash drives, disk drives, tape drives, or some other memory circuitry. Physical application database 110 comprises database software like operating systems, communication protocols, and database applications. Logical user databases 111-113 comprise software database applications that are stored and executed within physical database 110. KPI processor 114 comprises circuitry and software in physical database 110 which stores user service data to associate physical database 110 with logical user databases and to associate individual logical user databases with individual user computer services.

Physical application server 120 comprises computer equipment like Central Processing Units (CPU), memory circuitry, Input/Output (I/O) transceivers, and bus circuitry. Physical application server 120 comprises computer software like operating systems, communication protocols, and user applications. Logical user application servers 121-123 comprise software app server applications that execute various user applications in physical application server 120. KPI processor 124 comprises circuitry and software in physical application server 120 that stores user service data to associate physical application server 120 with logical user application servers and to associate individual logical application servers with individual user computer services.

Physical web server 130 comprises computer equipment like CPU, memory circuitry, I/O transceivers, and bus circuitry. Physical web server 130 comprises computer software like operating systems, communication protocols, and web applications. Logical user web servers 131-133 comprise software web server applications, data structures, and communication protocols that are stored and executed in physical web server 130. KPI processor 134 comprises circuitry and software in physical web server 130 that stores user service data to associate physical web server 130 with logical user application servers and to associate individual logical user application servers with individual user computer services.

Physical KPI server 140 comprises computer equipment like CPU circuitry, memory circuitry, I/O transceivers, and bus circuitry. Physical KPI server 140 comprises computer software like operating systems, communication protocols, and KPI applications. Physical KPI server 140 stores user servicer data to associate individual outlier KPI vectors with specific computer performance anomalies for individual user computer services.

Physical database 110 generates physical database KPI data comprising physical database KPIs, physical database identifiers, and database KPI times. For example, flash storage units may report their hardware ID, percent utilization, and measurement time. Physical database 110 transfers the database KPI data to KPI processor 121—typically through an operating system. The database KPI data may also include database Operating System (OS) KPI data and times. For example, a database OS may separately report the status of the ethernet component, internet component, and application component in its communication protocol stack. The KPI data is generated over time and indicates various KPI measurement times. The KPI measurement times are not uniform, so the KPI data is aligned in time across computer system 100 to create time-slices of KPI data for KPI vector generation. Physical database 110 aligns the database KPI data in time based on the measurement KPI times.

After time-alignment, physical database 110 converts the physical database KPI data for a given time interval into logical database KPI data based on the user service data. For example, the user service data associates physical database 110 with logical user databases 111-113, so physical database 110 would convert its physical KPI data into KPI data for logical user database 111, KPI data for logical user database 112, and KPI data for logical user database 113.

After physical/logical conversion, physical database 110 combines the database KPI data for individual ones of logical user databases 111-113. For example, logical user database 111 may have separate KPIs for controller bandwidth, available capacity, and memory faults, so physical database 110 combines the separate bandwidth, capacity, and fault KPIs into a single database KPI for logical user database 111. Physical database 110 then combines the database KPI data for individual ones of the user computer services. For example, the user service data may associate a national drone registration service with logical user databases 111-112, so physical database 110 would combine the KPI data for logical user database 111 and the KPI data for logical user database 112 into KPI data for the national drone registration service. The resulting database KPI data comprises user database vectors that each have physical KPIs from physical database 110 that are pertinent to the specific user computer service during the time interval. Physical database 110 transfers the user database KPI vectors to physical KPI server 140.

Physical application server 120 generates physical application server KPI data comprising physical application server KPIs, physical application server identifiers, and application server KPI times. The application server KPI data may also include application server OS data and OS KPI times. For example, the application server OS may report the session data like user numbers, session durations, session drops, and the like. The KPI data is generated over time and indicates KPI measurement times that are not uniform. Physical database 110 aligns the database KPI data in time based on the measurement KPI times to create time-slices of KPI data across computer system 100 for KPI vector generation.

After time-alignment, physical application server 120 converts the physical application server KPI data for the given time interval into logical application server KPI data based on the user service data. For example, the user service data associates physical application server 120 with logical application servers 121-123, so physical application server 120 converts its physical KPI data into KPI data for logical application server 121, KPI data for logical application server 122, and KPI data for logical application server 123.

After physical/logical conversion, physical application server 120 combines the application server KPI data for individual ones of logical user application servers 121-123. For example, logical user application server 121 may have separate KPIs for CPU load, average session duration, and memory latency, so physical database 110 combines the separate CPU, session, and memory KPIs into a single KPI for logical user application server 121. Physical application server 120 then combines the KPI data for individual ones of the user computer services. For example, the national drone registration service may be associated with logical user application servers 121-122, so physical application server 120 would combine the KPI data for logical user application server 121 and the KPI data for logical user application server 122 into KPI data for the national drone registration service. The resulting user application server KPI data comprises user application server vectors that each have physical KPIs from physical application server 120 that are pertinent to the specific user computer service during the time interval. Physical application server 120 transfers the application server KPI vectors to physical KPI server 140.

Physical web server 130 generates physical web server KPI data comprising physical web server KPIs, physical web server identifiers, and web server KPI times. The web server KPI data may also include web server OS data and OS KPI times. For example, the web server OS may report the web data for its user sessions like session bandwidth, average session data amount, and the like. The KPI data is generated over time and indicates KPI measurement times that are not uniform. Physical web server 130 aligns the web server KPI data in time based on the measurement KPI times to create time-slices of KPI data across computer system 100.

After time-alignment, physical web server 130 converts the physical web server KPI data for the given time interval into logical web server KPI data based on the user service data. For example, the user service data may associate physical web server 130 with logical web servers 131-133, so physical application server 120 would convert its physical KPI data into KPI data for logical web server 131, KPI data for logical web server 132, and KPI data for logical web server 133.

After physical/logical conversion, physical web server 130 combines the web server KPI data for individual ones of logical user web servers 131-133. For example, logical user web server 131 may have separate KPIs for I/O bandwidth, session number, and application server latency, so physical web server 130 combines the separate I/O, session, and application KPIs into a single KPI for logical user web server 131. Physical web server 130 then combines the KPI data for individual ones of the user computer services. For example, the user service data may associate the national drone registration service with logical web servers 131 and 133, so physical web server 130 would combine the KPI data for logical user web server 131 with the KPI data for logical user web server 133 into KPI data for the national drone registration service. The resulting web server KPI data for the user computer service comprises web server KPI vectors that have time-aligned KPIs from physical web server 130 that are pertinent to that user computer service during the time interval. Physical web server 130 transfers the web server KPI vectors to physical KPI server 140.

Physical KPI server 140 receives the database KPI vectors, application server KPI vectors, and web server KPI vectors for the user computer services during the time interval. Physical KPI server 140 combines the database KPI vectors, application server KPI vectors, and web server KPI vectors for individual ones of the user computer services during the time interval. For example, some of the KPI vectors indicate the national drone registration service, so physical KPI server 140 combines the user database vectors, the user application server vectors, and the user web server vectors that indicate the national drone service into a single KPI vector for the national drone registration service. The resulting user service KPI vector comprises the time-aligned physical KPIs that are pertinent to that user computer service during the time interval.

Physical KPI server 140 evaluates each user service KPI vector against a pre-trained machine learning model to detect outliner KPI vectors that represent anomalies in the service. The machine learning model is trained from a library of normal and non-anomalous KPI vectors that were collected during normal operation. Subsequently, new user service KPI vectors may be compared to the KPI outlier vectors to detect anomalies. Physical KPI server 140 indicates the specific computer performance anomaly for the individual the user computer service when an outlier KPI vector is detected. Physical KPI server 140 may also present graphic images of the user service KPI vector—perhaps by using principal component analysis.

Computer system 100 comprises computer hardware and software that is configured and integrated together to improve the end-user computing experience by processing large amounts of KPIs to detect computer performance anomalies for specific user computer services. The computer hardware comprises processing circuitry like CPUs, Digital signal Processors (DSPs), Graphical Processing Units (GPUs), I/O transceivers, bus circuitry, and memory circuitry. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuity and storage registers. The logic circuitry and storage registers are arranged to form larger structures like Control Units (CUs), Logic Units (LUs), and Random Access Memory (RAM). In turn, the CUs, LUs, and RAM are metallically connected to form CPUs, DSPs, GPUs, transceivers, bus circuitry, and memory.

In the computer hardware, the CUs drive data between the RAM and the LUs, and the LUs operate on the data. The CUs also drive interactions with external memory like flash drives, disk drives, and the like. The computer hardware executes machine-level software to control and move data by driving machine-level inputs like voltages and currents to the CUs, LUs, and RAM. The machine-level software is typically compiled from higher-level software programs. The higher-level software programs comprise operating systems, utilities, applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control.

Figure 2:
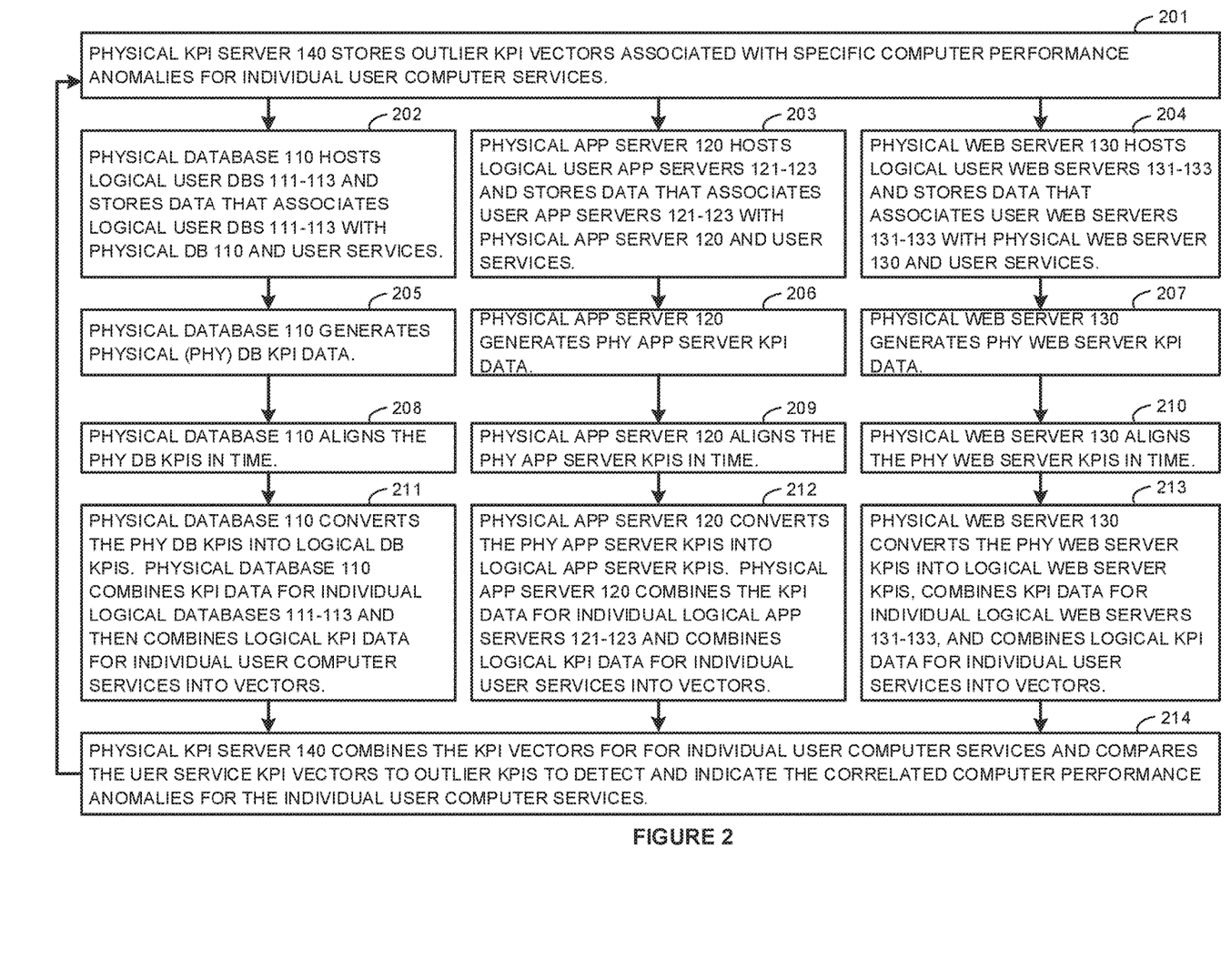
FIG. 2 illustrates the operation of the computer system to identify the computer performance anomalies based on the KPIs in an exemplary embodiment although the operation may vary in other embodiments.

FIG. 2 illustrates the operation of computer system 100 to identify the computer performance anomalies based on the computer KPIs in an exemplary embodiment although the operation may vary in other embodiments. Physical KPI server 140 stores outlier KPI vectors that are correlated to specific computer performance anomalies for individual user computer services (201). Physical database 110 hosts logical user databases 111-113 and stores user service data that associates logical user databases 111-113 with physical database 110 and with individual user computer services (202). Physical application server 120 hosts logical user application servers 121-123 and stores user service data that associates individual logical user application servers 121-123 with physical application server 110 and with individual user computer services (203). Physical web server 130 hosts logical user web servers 131-133 and stores data that associates individual logical user web servers 131-133 with physical web server 130 and with individual user computer services (204).

Physical database 110 automatically generates physical database KPIs that characterize current physical database 110 status (205). Physical application server 120 automatically generates physical application server KPIs that characterize current physical application server 120 status (206). Physical web server 130 automatically generates physical web server KPIs that characterize current physical web server 130 status (207). Physical database 110 aligns the physical database KPIs in time based on the database KPI times (208). Physical application server 120 aligns the physical application server KPIs in time based on the application server KPI times (209). Physical web server 130 aligns the physical web server KPIs in time based on the web server KPI times (210).

For individual time-frames, physical database 110 converts the physical database KPIs into user database KPIs for logical user database 111, logical user database 112, and logical user database 113 (211). Physical database 110 combines the KPIs for individual ones of logical user databases 111-113. For example, logical user database 111 may have separate KPIs for CPU usage and for memory usage, so physical database 110 combines the separate CPU and memory KPIs into a single database KPI. Physical database 110 then combines the KPIs for logical databases 111-113 into KPIs for individual user computer services. For example, an on-line retail business may use logical user databases 112-113, so physical database 110 combines the KPIs for logical user databases 112-113 into KPIs for the on-line retail business service. The database KPI forms a database KPI vector for the individual user computer service during the time interval. The database KPI vector comprises the physical KPIs from physical database 110 that are pertinent to the individual user computer service during the time interval. Physical database 110 transfers the database KPI vectors to KPI server 140.

For the individual time-frames, physical application server 120 converts the physical application server KPIs into KPIs for logical user application server 121, KPIs for logical user application server 122, and KPIs for logical user application server KPIs (212). Physical application server 120 combines the application server KPIs for individual ones of logical user application server 121-123. For example, logical user application server 121 may have separate KPIs for user loading and average session time, so physical application server 120 combines the separate loading and session KPIs into a single KPI for user application server 121. Physical application server 120 then combines the logical application server KPIs for individual user computer services. For example, the on-line retail business may use logical user application servers 121-122, so physical application server 120 combines the KPIs for user application server 121 and the KPIs for user application server 122 into a single KPI for the on-line retail business. The user application server KPI forms an application server KPI vector for the individual user computer service during the time interval. The application KPI vector comprises the physical KPIs from physical application server 120 that are pertinent to the individual user computer service during the time interval. Physical application server 120 transfers the application server KPI vectors to KPI server 140.

For the individual time-frames, physical web server 130 converts the physical web server KPIs into KPIs for logical user web server 131, KPIs for logical user web server 132, and KPIs for logical user web server 133 (213). Physical web server 130 combines the web server KPIs for individual ones of logical user web servers 131-133. For example, logical user web server 132 may have separate KPIs for I/O data rate and web session loading, so physical web server 130 combines the separate I/O and session KPIs into a single KPI for user web server 132. Physical web server 130 then combines the logical web server KPIs for individual user computer services. For example, the on-line retail business may use logical user web servers 131 and 133, so physical web server 130 combines the KPI for user web server 131 and the KPI for user web server 133 into a single web server KPI for the on-line retail business. The web server KPI forms a web server KPI vector for the individual user computer service during the time interval. The web server KPI vector comprises the physical KPIs form physical web server 130 that are pertinent to the individual user computer service during the time interval. Physical web server 130 transfers the user web server KPI vectors to KPI server 140.

For each time-frame, physical KPI server 140 combines the user database KPI vectors, the user application server KPI vectors, and the user web server KPI vectors for individual user computer services into user service vectors (214). For example, the on-line retail business may have a user database KPI vector, application server KPI vector, and web server KPI vector during the time interval, so physical KPI server 140 combines the user database KPI vector, application server KPI vector, and web server KPI vector into a single user service KPI vector for the on-line retail business. Physical KPI server 140 then compares each user service KPI vector to the outlier KPI vectors to detect matches that are correlated to the specific computer performance anomalies (214). Physical KPI server 140 indicates the detected computer performance anomalies for the individual user computer services (214).

Figure 3:
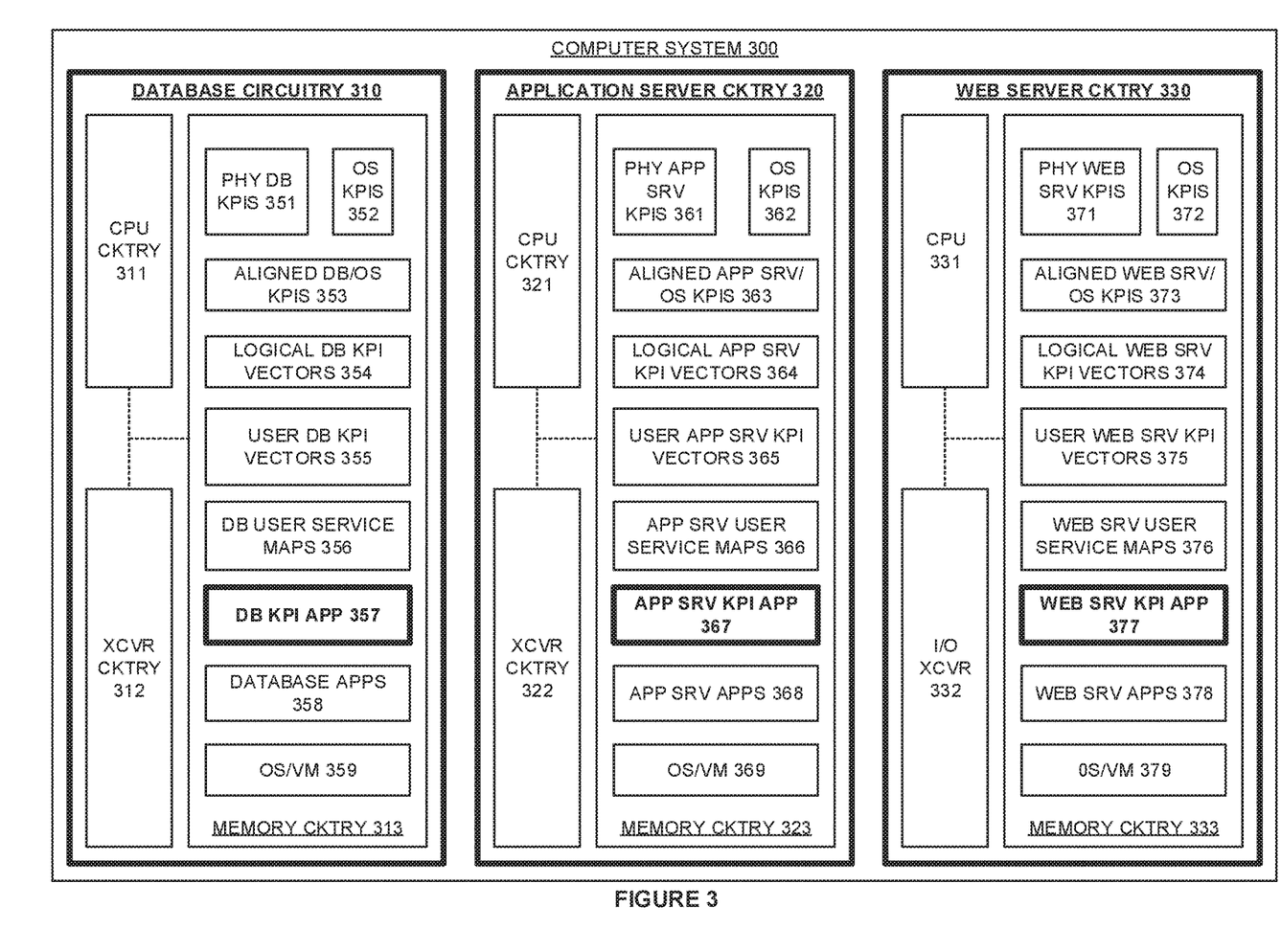
FIG. 3 illustrates computer circuitry to identify computer performance anomalies based on KPIs in an exemplary embodiment although the computer circuitry may vary in other embodiments.

FIG. 3 illustrates computer system 300 to identify computer performance anomalies based on computer KPIs in an exemplary embodiment although the computer system may vary in other embodiments. Computer system 300 comprises database circuitry 310, application server circuitry (CK-TRY) 320, and web server circuitry 330. Database circuitry 310 comprises CPU circuitry 311, transceiver (XCVR) circuitry 312, and memory circuitry 313. Memory circuitry 313 stores physical (PHY) database (DB) KPIs 351, Operating System (OS) KPIs 352, aligned DB/OS KPIs 353, logical database KPI vectors 354, user database KPI vectors 355, database user service maps 356, database KPI application (APP) 357, database applications 358, and OS/Virtual Machines (VM) 359.

Application server circuitry 320 comprises CPU circuitry 321, transceiver circuitry 322, and memory circuitry 323. Memory circuitry 323 stores physical application server (SRV) KPIs 361, OS KPIs 362, aligned APP SRV/OS KPIs 363, logical application server KPI vectors 364, user application server KPI vectors 365, application server user service maps 366, application server KPI application 367, application server applications 368, and OS/VM 369. Web server circuitry 330 comprises CPU circuitry 331, transceiver circuitry 332, and memory circuitry 333. Memory circuitry 333 stores physical web server KPIs 371, OS KPIs 372, aligned WEB SRV/OS KPIs 373, logical web server KPI vectors 374, user web server KPI vectors 375, web server user service maps 376, web server KPI application 377, web server applications 378, and OS/VM 379.

In database circuitry 310, CPU circuitry 311 executes OS/VM 359 and database applications 358 to host logical user databases and generate physical database KPIs 351 and OS KPIs 352. CPU circuitry 311 executes DB KPI application 357 to align physical database KPIs 351 and OS KPIs 352 in time to form aligned DB/OS KPIs 353. CPU circuitry 311 executes DB KPI application 357 to convert aligned DB/OS KPIs 353 into logical database KPI vectors 354 based on the physical-to-logical database associations in DB user service maps 356. CPU circuitry 311 executes DB KPI application 357 to aggregate logical database KPI vectors 354 for the individual user computer services to form user database KPI vectors 355. CPU circuitry 311 executes DB KPI application 357 to transfer user database KPI vectors 355 to KPI server circuitry.

In application server circuitry 320, CPU circuitry 321 executes OS/VM 369 and application server applications 368 to host logical user application servers and generate physical application server KPIs 361 and OS KPIs 362. CPU circuitry 321 executes application server KPI application 367 to align physical application server KPIs 361 and OS KPIs 362 in time to form aligned APP SRV/OS KPIs 363. CPU circuitry 321 executes application server KPI application 367 to convert APP SRV/OS KPIs 363 into logical application server KPI vectors 364 based on the physical-to-logical application server associations in application server user service maps 366. CPU circuitry 321 executes application server KPI application 367 to aggregate logical application server KPI vectors 364 for individual user computer services to form user application server KPI vectors 365. CPU circuitry 321 executes application server KPI application 367 to transfer user application server KPI vectors 365 to KPI server circuitry.

In web server circuitry 330, CPU circuitry 331 executes OS/VM 379 and web server applications 378 to host logical user web servers and generate physical web server KPIs 371 and OS KPIs 372. CPU circuitry 331 executes web server KPI application 377 to align physical web server KPIs 371 and OS KPIs 372 in time to form aligned WEB SRV/OS KPIs 373. CPU circuitry 331 executes web server KPI application 377 to convert WEB SRV/OS KPIs 373 into logical web server KPI vectors 374 based on the physical-to-logical web server associations in application server user service maps 376. CPU circuitry 331 executes web server KPI application 377 to aggregate logical web server KPI vectors 374 for individual user computer services to form user web server KPI vectors 375. CPU circuitry 331 executes web server KPI application 377 to transfer user web server KPI vectors 375 to KPI server circuitry.

Figure 4:
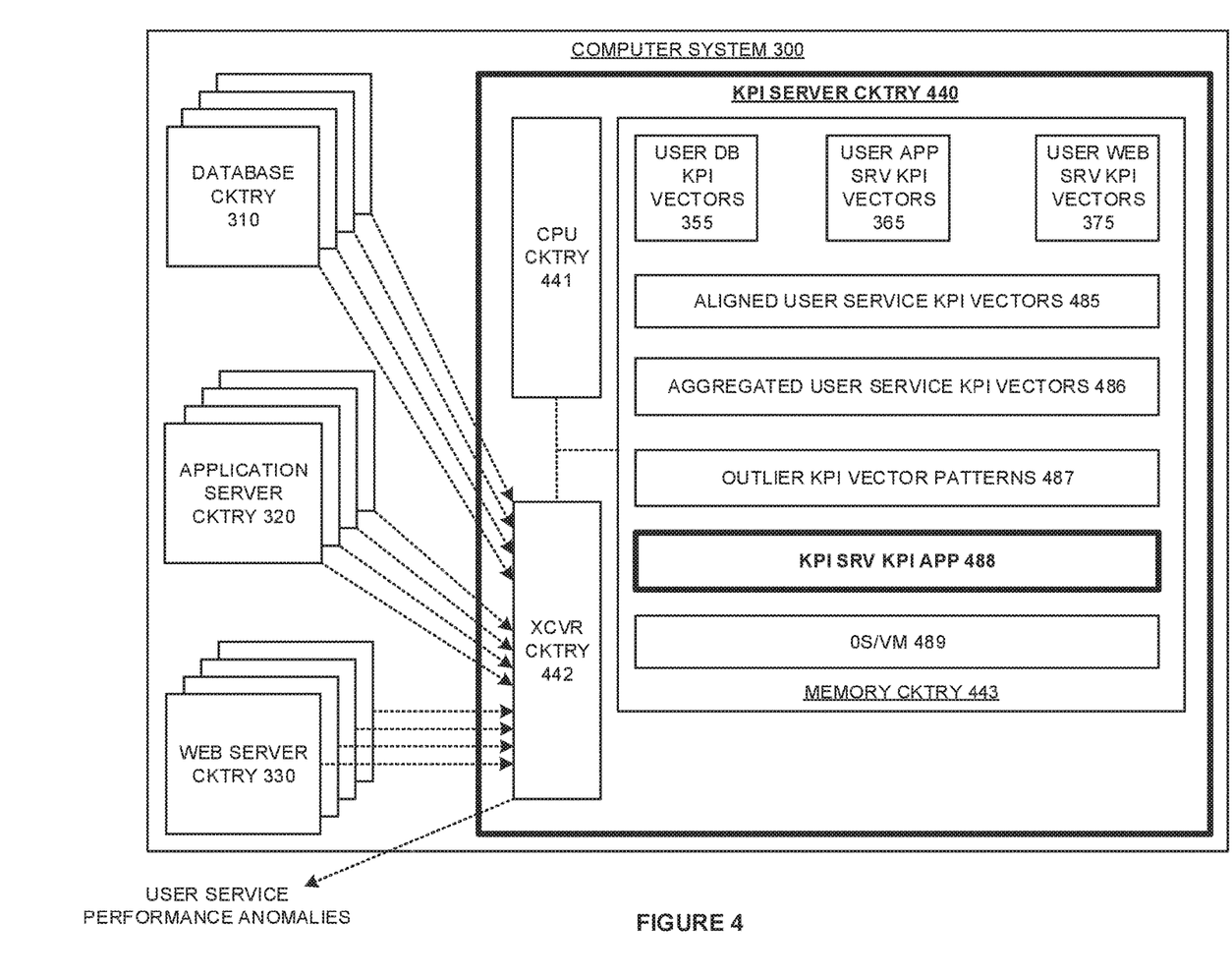
FIG. 4 illustrates computer circuitry to identify computer performance anomalies based on KPIs in an exemplary embodiment although the computer circuitry may vary in other embodiments.

FIG. 4 further illustrates computer system 300 to identify computer performance anomalies based on computer KPIs in an exemplary embodiment although the computer system may vary in other embodiments. Computer system 300 comprises database circuitry 310, application server circuitry 320, and web server circuitry 330, and KPI server circuitry 440. KPI server circuitry 440 comprises CPU circuitry 441, transceiver circuitry 442, and memory circuitry 443. Memory circuitry 443 stores user database KPI vectors 355, user application server KPI vectors 365, user web server KPI vectors 366, aligned user service KPI vectors 485, aggregated user service KPI vectors 486, outlier KPI vector patterns 487, KPI server application 488 and OS/VM 489.

In KPI server circuitry 440, CPU circuitry 441 executes OS/VM 489 to host KPI server application 488. KPI server application 488 directs CPU circuitry 441 to align user KPI vectors 355, 365, and 375 in time to form aligned user service KPI vectors 485. KPI server application 488 directs CPU circuitry 441 to combine aligned user service KPI vectors 485 for individual user computer services to form aggregated user service KPI vectors 486. For example, the database vector, application server vector, and web server vector for the on-line retail business in a given time interval would be combined into a single user service vector for the on-line retail business. KPI server application 488 directs CPU circuitry 441 to compare each one of user service KPI vectors 486 to outlier KPI vector patterns 487 to detect matches and identify their corresponding computer performance anomalies for the associated user computer services. KPI server application 488 directs CPU circuitry 441 to drive transceiver circuitry 442 to indicate the specific computer performance anomalies for the individual user computer services.

Referring to both FIGS. 3 and 4, CPU circuitry 311, 321, 331, and 441 comprises circuit boards, integrated microprocessors, cache memory, RAM, and associated electronics. XCVR circuitry 312, 322, 332, and 442 comprises communication equipment, such as ports, bus interfaces, signal processors, memory, software, and the like. Memory circuitry 313, 323, 333, and 443 comprises non-transitory, machine-readable, data storage media, such as flash drives, disc drives, and the like. All or portions of the software components may be externally stored on one or more storage media, such as circuitry, discs, flash memory, and the like. Some conventional aspects of circuitry 310, 320, 330, and 440 are omitted for clarity, such as power supplies and enclosures.

Figure 5:
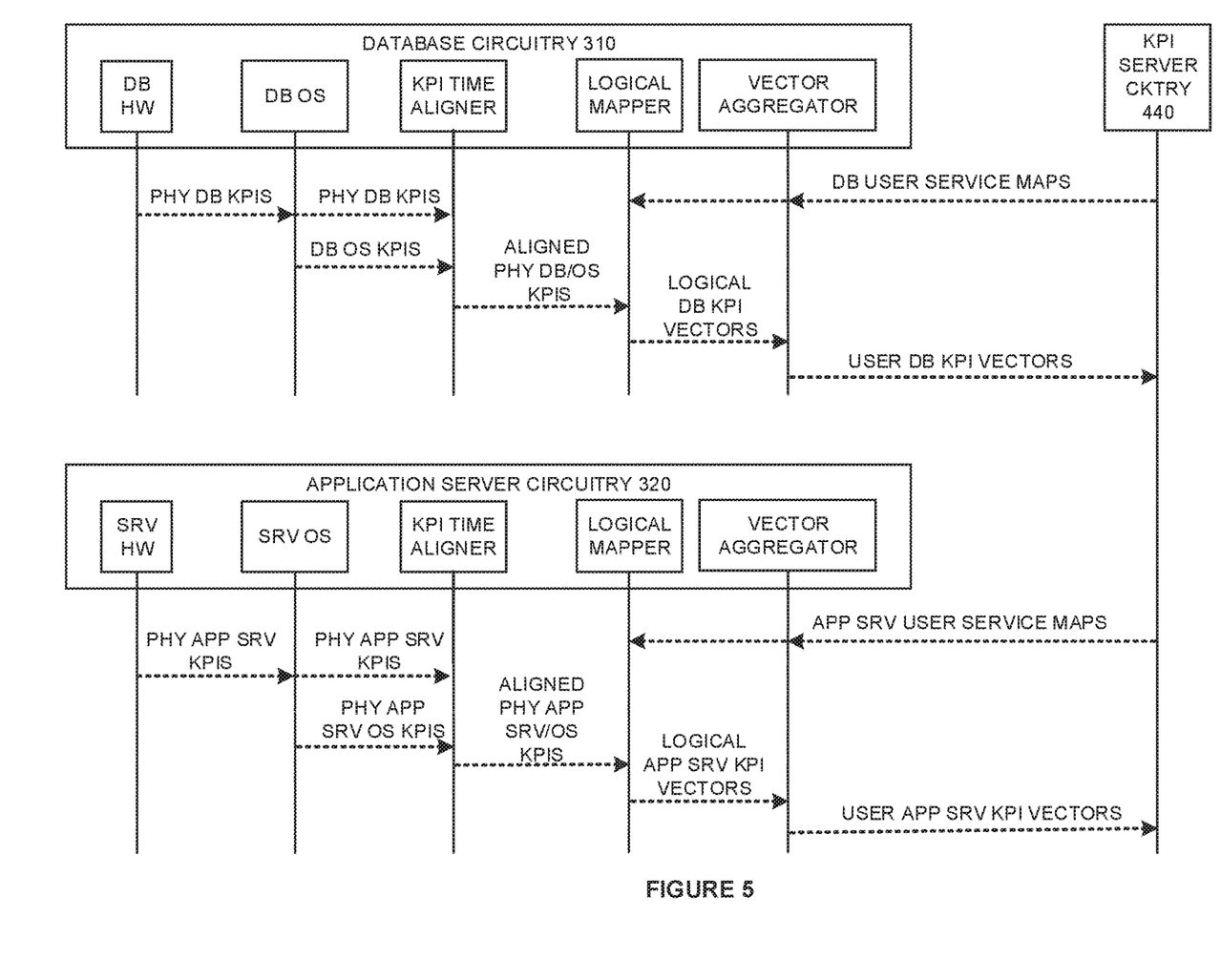
FIG. 5 illustrates the operation of the computer circuitry to identify computer performance anomalies based on the KPIs in an exemplary embodiment although the operation may vary in other embodiments.
Figure 6:
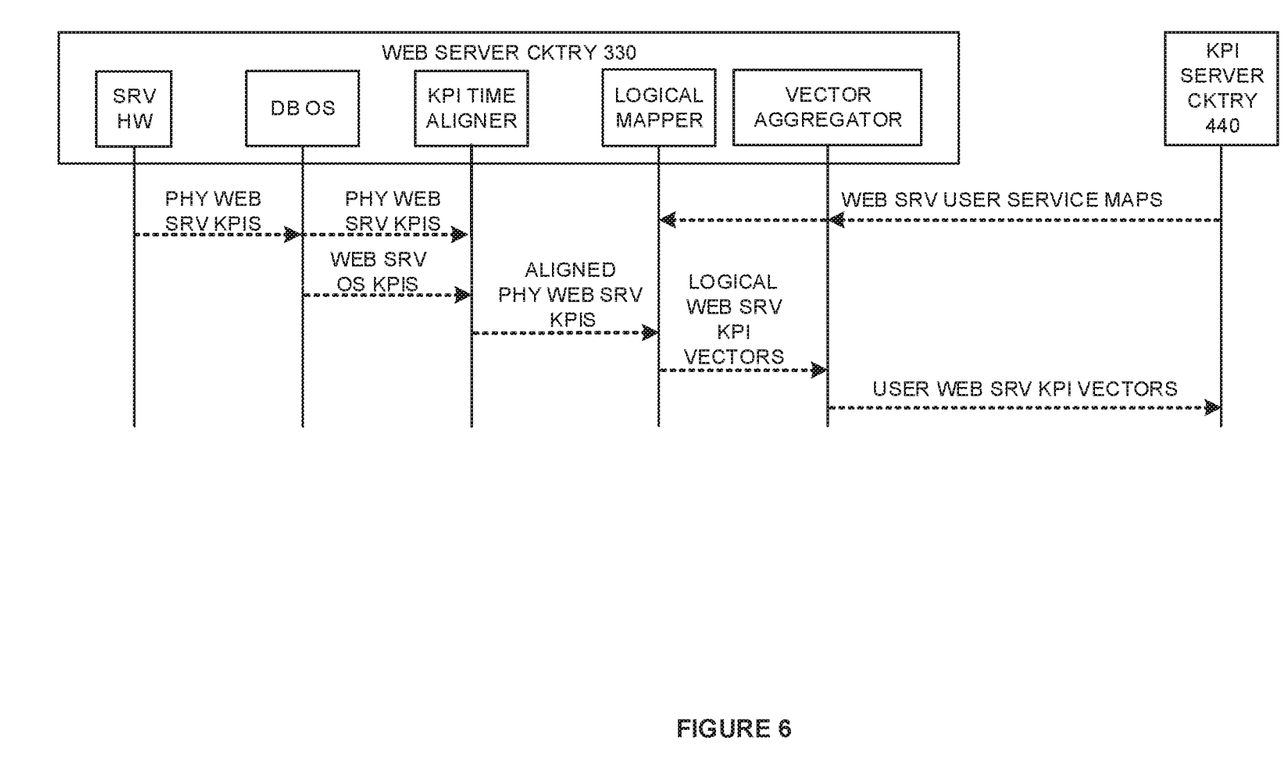
FIG. 6 illustrates the operation of the computer circuitry to identify computer performance anomalies based on the KPIs in an exemplary embodiment although the operation may vary in other embodiments.
Figure 7:
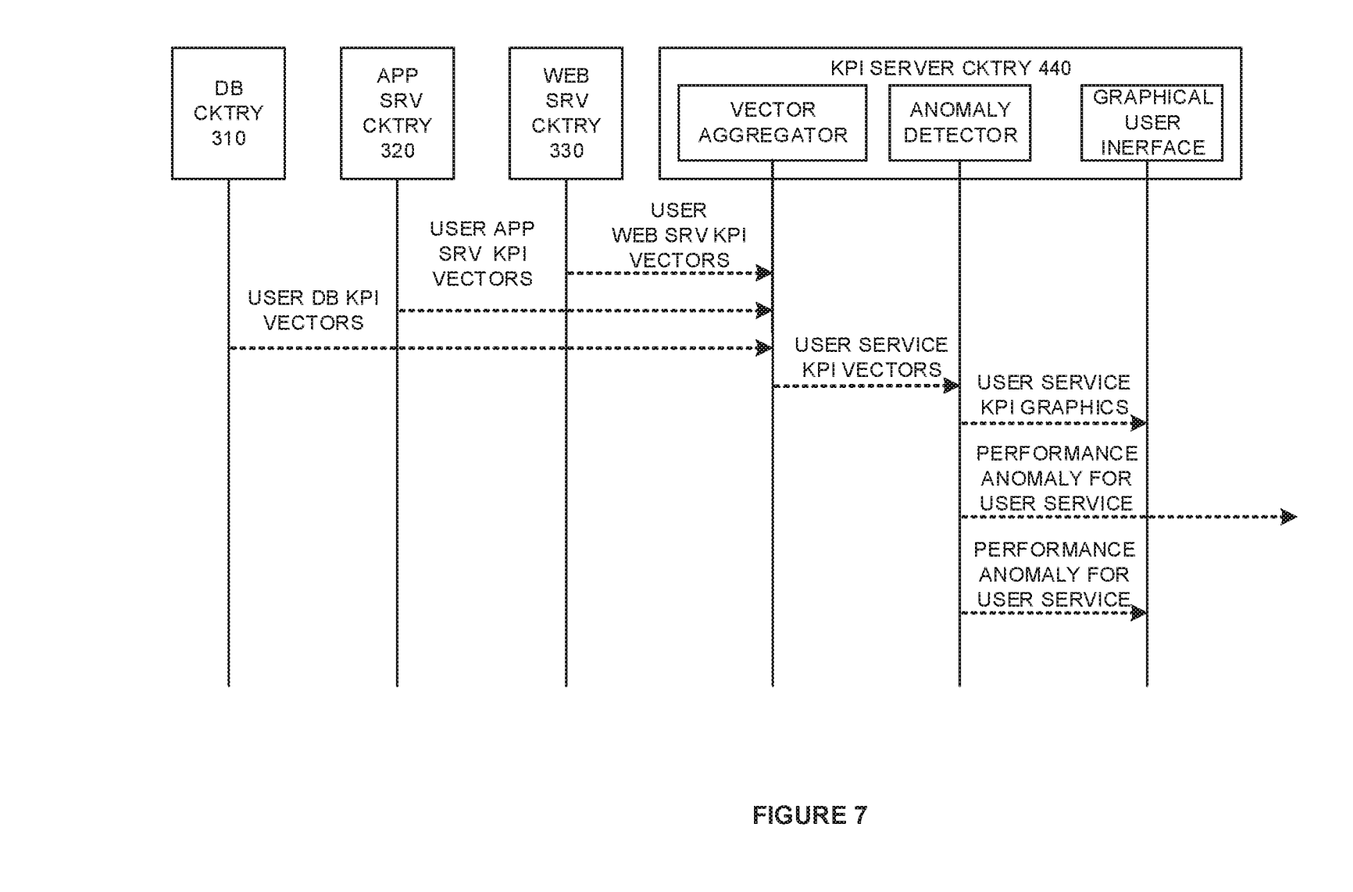
FIG. 7 illustrates the operation of the computer circuitry to identify computer performance anomalies based on the KPIs in an exemplary embodiment although the operation may vary in other embodiments.

FIG. 5-7 illustrate the operation of computer system 300 to identify computer performance anomalies based on the computer KPIs in an exemplary embodiment although the operation may vary in other embodiments. Referring to FIG. 5, KPI server circuitry 440 transfers database user service maps to a logical mapper and vector aggregator in database KPI application 357 in database circuitry 310. Database hardware (HW) generates physical database KPIs that characterize current database status. The DB HW transfers the physical database KPIs to the DB OS. The DB OS also generates database OS KPIs that characterize current database OS and application status. The DB OS transfers the physical database KPIs and the DB OS KPIs to a KPI time aligner in DB KPI application 357. The KPI time aligner aligns the physical database KPIs and the OS KPIs in time. The KPI time aligner transfers the aligned database KPIs and OS KPIs to the logical mapper in DB KPI application 357. The logical mapper converts the aligned DB/OS KPIs into logical DB KPI vectors. The logical mapper transfers the logical DB KPI vectors to the vector aggregator in DB KPI application 357. The vector aggregator combines the logical DB KPI vectors for the individual logical databases. The vector aggregator then combines the logical DB KPI vectors for the individual user computer services. The vector aggregator transfers the resulting user DB KPI vectors for individual user computer services to KPI server circuitry 440.

KPI server circuitry 440 transfers application server user service maps to a logical mapper and vector aggregator in KPI application 367 in application server circuitry 320. Application server hardware generates physical APP SRV KPIs that characterize current application server status. The application server HW transfers the physical APP SRV KPIs to the application server OS. The application server OS also generates application server OS KPIs that characterize current application server OS and application status. The application server OS transfers the physical APP SRV KPIs and the OS KPIs to a KPI time aligner in application server KPI application 367. The KPI time aligner aligns the physical APP SRV KPIs and the OS KPIs in time. The KPI time aligner transfers the aligned APP SRV KPIs and OS KPIs to the logical mapper in application server KPI application 367. The logical mapper converts the aligned APP SRV/OS KPIs into logical APP SRV KPI vectors.

The logical mapper transfers the logical APP SRV KPI vectors to the vector aggregator in application server KPI application 367. The vector aggregator combines the logical application server KPI vectors for the individual logical application servers. The vector aggregator then combines the logical application server KPI vectors for the individual user services. The vector aggregator transfers the resulting user application server KPI vectors for individual user computer services to KPI server circuitry 440.

Referring to FIG. 6, KPI server circuitry 440 transfers web server user service maps to a logical mapper and vector aggregator in KPI application 377 in web server circuitry 330. Web server hardware generates physical WEB SRV KPIs that characterize current web server status. The web server HW transfers the physical WEB SRV KPIs to the web server OS. The web server OS also generates web server OS KPIs that characterize current web server OS and web application status. The web server OS transfers the physical WEB SRV KPIs and the OS KPIs to the KPI time aligner in web server KPI application 377. The KPI time aligner aligns the physical WEB SRV KPIs and the OS KPIs in time. The KPI time aligner transfers the aligned WEB SRV KPIs and OS KPIs to the logical mapper in web server KPI application 377. The logical mapper converts the aligned WEB SRV/OS KPIs into logical WEB SRV KPI vectors.

The logical mapper transfers the logical WEB SRV KPI vectors to the vector aggregator in web server KPI application 377. The vector aggregator combines the logical web server KPI vectors for the individual logical web servers. The vector aggregator then combines the logical web server KPI vectors for the individual user computer services. The vector aggregator transfers the resulting user web server KPI vectors for individual user computer services to KPI server circuitry 440.

Referring to FIG. 7, KPI server circuitry 440 receives the user web server KPI vectors from web server circuitry 330. KPI server circuitry 440 receives the user application server KPI vectors from application server circuitry 320. KPI server circuitry 440 receives the user database KPI vectors from database circuitry 310. In KPI server circuitry 440, a vector aggregator in KPI server application 488 combines the user database KPI vectors, user application server KPI vectors, and user web server KPI vectors into user service KPI vectors for the individual user computer services.

In KPI server circuitry 440, an anomaly detector in KPI server application 488 transfers user service KPI graphics to a Graphical User Interface for user presentation. The anomaly detector compares each user service KPI vector to the outlier KPI vector patterns to detect matches that identify the corresponding computer performance anomalies for the associated user computer services. The anomaly detector transfers indications of the corresponding computer performance anomalies for the individual user computer services to the Graphical User Interface and to other systems.

The above description and associated drawings teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a computer system to identify computer performance anomalies for individual user computer services based on Key Performance Indicators (KPIs), the method comprising:
   physical databases hosting logical databases, generating physical database KPIs, and converting the physical database KPIs into logical database KPI vectors for the individual user computer services;
   physical application servers hosting logical application servers, generating physical application server KPIs, and converting the physical application server KPIs into logical application server KPI vectors for the individual user computer services;
   physical web servers hosting logical web servers, generating physical web server KPIs, and converting the physical web server KPIs into logical web server KPI vectors for the individual user computer services; and
   a physical KPI server combining the logical database KPI vectors, the logical application server KPI vectors, and the logical web server KPI vectors into user service KPI vectors for the individual user computer services, detecting outlier ones of the user service KPI vectors, storing vector patterns of the outlier ones of the user service KPI vectors, and detecting individual ones of the computer performance anomalies for ones of the individual user computer services based on matching the user service KPI vectors corresponding to the individual ones of the computer performance anomalies to the vector patterns of the outlier ones of the user service KPI vectors,
   wherein detecting the outlier ones of the user service KPI vectors comprises evaluating the user service KPI vectors by a machine learning model trained to detect outlier user service KPI vectors from a library of normal and non-anomalous KPI vectors, and wherein the outlier ones of the user service KPI vectors are correlated to the individual ones of the computer performance anomalies for the individual user computer services.

2. The method of claim 1 further comprising the physical databases generating operating system KPIs and integrating the operating system KPIs into the logical database KPI vectors for the individual user computer services.

3. The method of claim 1 further comprising the physical application servers generating operating system KPIs and integrating the operating system KPIs into the logical application server KPI vectors for the individual user computer services.

4. The method of claim 1 further comprising the physical web servers generating operating system KPIs and integrating the operating system KPIs into the logical web server KPI vectors for the individual user computer services.

5. The method of claim 1 wherein:
   converting the physical database KPIs into the logical database KPI vectors comprises aligning the physical database KPIs in time;
   converting the physical application server KPIs into the logical application server KPI vectors comprises aligning the physical application server KPIs in time; and converting the physical web server KPIs into the logical web server KPI vectors comprises aligning the physical web server KPIs in time.

6. The method of claim 1 wherein:
converting the physical database KPIs into the logical database KPI vectors comprises converting the physical database KPIs into logical database KPIs;
converting the physical application server KPIs into the logical application server KPI vectors comprises converting the physical application server KPIs into logical application server KPIs; and
converting the physical web server KPIs into the logical web server KPI vectors comprises converting the physical web server KPIs into logical web server KPIs.

7. The method of claim 1 wherein:
converting the physical database KPIs into the logical database KPI vectors comprises aggregating logical database KPIs;
converting the physical application server KPIs into the logical application server KPI vectors comprises aggregating logical application server KPIs; and
converting the physical web server KPIs into the logical web server KPI vectors comprises aggregating logical web server KPIs.

8. A computer system to identify computer performance anomalies for user computer services based on computer Key Performance Indicators (KPIs), the computer system comprising:
physical databases configured to host logical databases, generate physical database KPIs, and convert the physical database KPIs into logical database KPI vectors for individual user computer services;
physical application servers configured to host logical application servers, generate physical application server KPIs, and convert the physical application server KPIs into logical application server KPI vectors for the individual user computer services;
physical web servers configured to host logical web servers, generate physical web server KPIs, and convert the physical web server KPIs into logical web server KPI vectors for the individual user computer services; and
a physical KPI server configured to combine the logical database KPI vectors, the logical application server KPI vectors, and the logical web server KPI vectors into user service KPI vectors for the individual user computer services, detect outlier ones of the user service KPI vectors, store vector patterns of the outlier ones of the user service KPI vectors, and detect individual ones of the computer performance anomalies for ones of the individual user computer services based on matching the user service KPI vectors corresponding to the individual ones of the computer performance anomalies to the vector patterns of the outlier ones of the user service KPI vectors;
wherein to detect the outlier ones of the user service KPI vectors, the physical KPI server is configured to evaluate the user service KPI vectors by a machine learning model trained to detect outlier user service KPI vectors from a library of normal and non-anomalous KPI vectors for the individual user computer services, and wherein the outlier ones of the user service KPI vectors are correlated to the individual ones of the computer performance anomalies.

9. The computer system of claim 8 further comprising the physical databases configured to generate operating system KPIs and integrate the operating system KPIs into the logical database KPI vectors for the individual user computer services.

10. The computer system of claim 8 further comprising the physical application servers configured to generate operating system KPIs and integrate the operating system KPIs into the logical application server KPI vectors for the individual user computer services.

11. The computer system of claim 8 further comprising the physical web servers configured to generate operating system KPIs and integrate the operating system KPIs into the logical web server KPI vectors for the individual user computer services.

12. The computer system of claim 8 wherein:
the physical databases are configured to align the physical database KPIs in time;
the physical application servers are configured to align the physical application server KPIs in time; and
the physical web servers are configured to align the physical web server KPIs in time.

13. The computer system of claim 8 wherein:
the physical databases are configured to convert the physical database KPIs into logical database KPIs;
the physical application servers are configured to convert the physical application server KPIs into logical application server KPIs; and
the physical web servers are configured to convert the physical web server KPIs into logical web server KPIs.

14. The computer system of claim 8 wherein:
the physical databases are configured to aggregate logical database KPIs
the physical application servers are configured to aggregate logical application server KPIs; and
the physical web servers are configured to aggregate logical web server KPIs.

15. A computer apparatus to identify computer performance anomalies based on computer Key Performance Indicators (KPIs) wherein
physical databases host logical databases, generate physical database KPIs, and convert the physical database KPIs into logical database KPI vectors for individual user computer services;
physical application servers host logical application servers, generate physical application server KPIs, and convert the physical application server KPIs into logical application server KPI vectors; and
physical web servers host logical web servers, generate physical web server KPIs, and convert the physical web server KPIs into logical web server KPI vectors; the computer apparatus comprising:
computer storage storing KPI computer instructions; and
the KPI computer instructions configured when executed by KPI circuitry to drive the KPI circuitry to combine the logical database KPI vectors and the logical application server KPI vectors and the logical web server KPI vectors into user service KPI vectors for the individual user computer services, detect outlier ones of the user service KPI vectors, store vector patterns of the outlier ones of the user service KPI vectors, and detect individual ones of the computer performance anomalies for individual ones of the individual user computer services based on matching the user service KPI vectors corresponding to the individual ones of the computer performance anomalies to the vector patterns of the outlier ones of the user service KPI vectors, wherein, to detect the outlier ones of the user service KPI vectors, the KPI computer instructions drive the KPI circuitry to evaluate the user service KPI vectors by a machine learning model trained to detect outlier user service KPI vectors from a library of normal and non-anomalous KPI vectors for the individual user computer services, and wherein the outlier ones of the user service KPI vectors are correlated to the individual ones of the computer performance anomalies.

16. The computer apparatus of claim 15 wherein the physical databases generate operating system KPIs and further comprising the KPI computer instructions configured when executed by KPI circuitry to drive the KPI circuitry to integrate the operating system KPIs into the logical database KPI vectors for the individual user computer services.

17. The computer apparatus of claim 15 wherein the physical application servers generate operating system KPIs and further comprising the KPI computer instructions configured when executed by KPI circuitry to drive the KPI circuitry to integrate the operating system KPIs into the logical application server KPI vectors for the individual user computer services.

18. The computer apparatus of claim 15 wherein the physical web servers generate operating system KPIs and further comprising the KPI computer instructions configured when executed by KPI circuitry to drive the KPI circuitry to integrate the operating system KPIs into the logical web server KPI vectors for the individual user computer services.

19. The computer apparatus of claim 15 wherein the KPI computer instructions are configured when executed by KPI circuitry to drive the KPI circuitry to align the physical database KPIs in time, align the physical application server KPIs in time, align the physical web server KPIs in time, convert the physical database KPIs into logical database KPIs, convert the physical application server KPIs into logical application server KPIs, and convert the physical web server KPIs into logical web server KPIs.

20. The computer apparatus of claim 15 wherein the KPI computer instructions are configured when executed by KPI circuitry to drive the KPI circuitry to aggregate logical database KPIs, aggregate logical application server KPIs, and aggregate logical web server KPIs.

* * * * *

UNITED STATES PATENT AND TRADEMARK OFFICE
CERTIFICATE OF CORRECTION

| | | |
|---|---|---|
| PATENT NO. | : 11,921,612 B2 | Page 1 of 1 |
| APPLICATION NO. | : 16/116274 | |
| DATED | : March 5, 2024 | |
| INVENTOR(S) | : Morariu et al. | |

It is certified that error appears in the above-identified patent and that said Letters Patent is hereby corrected as shown below:

In the Drawings

On sheet 2 of 7, in FIGURE 2, under Reference Numeral 214, Line 1, delete "FOR FOR" and insert -- FOR --, therefor.

On sheet 2 of 7, in FIGURE 2, under Reference Numeral 214, Line 2, delete "UER" and insert -- USER --, therefor.

In the Specification

In Column 10, Line 33, delete "FIG." and insert -- FIGS. --, therefor.

In the Claims

In Column 14, Line 31, in Claim 14, delete "KPIs" and insert -- KPIs; --, therefor.

Signed and Sealed this
Twenty-third Day of July, 2024

Katherine Kelly Vidal
*Director of the United States Patent and Trademark Office*